Nov. 16, 1926.

H. V. LOUGH 1,607,266

RUBBERIZED FABRIC AND ITS METHOD OF MANUFACTURE

Filed Oct. 10, 1925

Inventor.

HECTOR V. LOUGH

By
Ernest Hopkinson
Attorney

Patented Nov. 16, 1926.

1,607,266

UNITED STATES PATENT OFFICE.

HECTOR V. LOUGH, OF HARTFORD, CONNECTICUT, ASSIGNOR TO THE HARTFORD RUBBER WORKS COMPANY, OF HARTFORD, CONNECTICUT, A CORPORATION OF CONNECTICUT.

RUBBERIZED FABRIC AND ITS METHOD OF MANUFACTURE.

Application filed October 10, 1925. Serial No. 61,858.

This invention relates to the manufacture of rubber articles, and more particularly, of rubberized fabric for tires.

In the manufacture of tire casings by the flat building process, especially since the advent of the balloon tire, the breaker fabric when incorporated between the carcass and the tread frequently broke or ruptured.

It has been discovered that the trouble occasioned by the rupture of the breaker strips heretofore made of square woven fabric may be obviated by shifting or arranging the threads so that the weft is located at an acute angle to the warp and then rubberizing and cutting the web so that the shorter diagonal of the diamond-shaped mesh extends lengthwise of the breaker strips, such breaker strips when incorporated in the flat built pulley band, permitting the latter to be bulged out intermediate its beaded edges without rupture of the incorporated breaker. By such an arrangement of the warp and weft threads the breaker is imparted increased capacity to stretch. When distended, the warp and weft threads of such breaker material swing rather than stretch on the initial application of force or pressure and this swinging movement constitutes the increment in capacity to stretch over breakers as heretofore manufactured.

In the accompanying drawings

Figure 5:
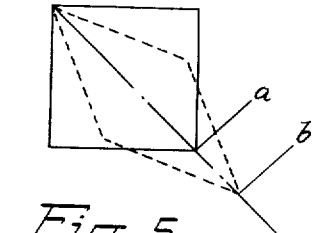
Figure 5 is an enlarged diagrammatic view of a single mesh of square woven fabric illustrating how it is altered under diagonal stretch.

Referring to Figure 5 of the drawings, the square indicated in solid lines illustrates a single mesh of the ordinary breaker fabric bounded by warp and weft threads. This old breaker fabric is ordinarily cut on the bias at an angle of 45°. If it has been incorporated in a tire band built flat on a drum, when that tire is distended to bring it to tire shape—by bulging it out intermediately and bringing its edges together— the distention will occur in the direction of one of the diagonals and will amount to the distance represented by $a—b$. In this stretching of the old breaker fabric the warp and weft threads are subjected to tension and the strain on the warp and weft threads increases the more nearly the warp and weft threads approach parallelism with the length of the strip, i. e., with the direction in which the stretching force is applied.

Figure 6:
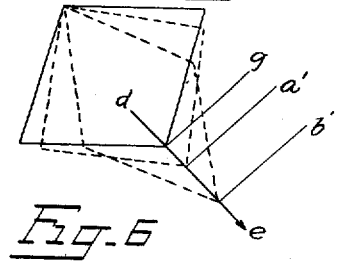
Figure 6 is a similar diagrammatic view of a single mesh of the fabric of the present invention illustrating how its warp and weft threads would first shift and then stretch in use.

Referring to Figure 6 of the drawings, the solid lines illustrate a mesh of my improved fabric either parallel side of which may be taken as illustrating the warp or weft threads, respectively. It will be noticed that the mesh is not square or rectangular and that the warp and weft threads are arranged at acute (or obtuse) angles, the diagonal of the diamond-shaped figure being shorter in the general direction of pull indicated by the line $d—e$, which is in the direction of the length of the new breaker material of this invention. When force is applied to the diamond shaped mesh illustrated in Figure 6, the corner $g$ will move to the point $a'$ in which condition the mesh will be restored to its original square (or rectangular) shape. Further distension or stretch moves the corner $g$ to a point such as $b'$. The distance represented by $g—a'$ is a clear gain in the capacity of the fabric to stretch inasmuch as in such movement the cords swing rather than stretch. And it is easier, that is, requires less force, to accomplish such swinging movement than it does to stretch the cords. Also, there is less narrowing in width of the cut strips.

Figure 1:
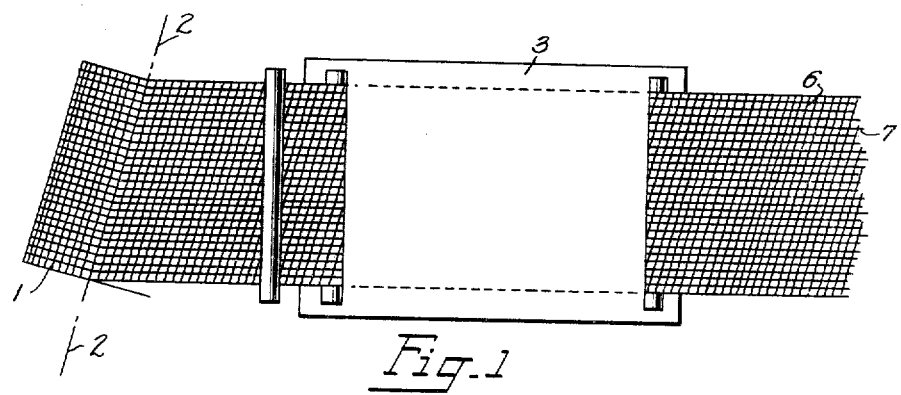
Figures 1 and 2 are more or less diagrammatic plan and side elevations, respectively, of a simple apparatus for forming the warp and weft threads into the desired relationship.
Figure 2:
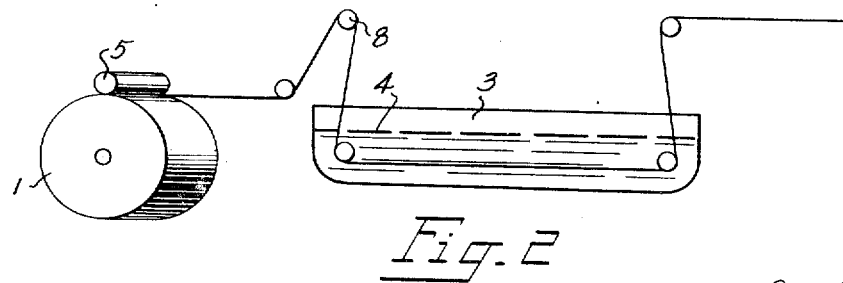
Figure 3:
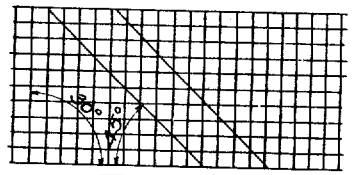
Figures 3 and 4 are diagrammatic views of the ordinary square woven fabric and of the special fabric of this invention, respectively.
Figure 4:
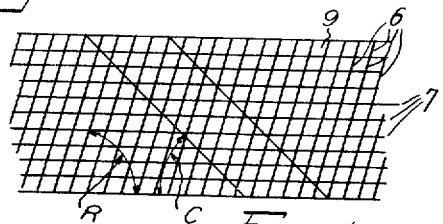

With the above in mind, the fabric or breaker material of square woven form as it is ordinarily obtained from the mill is unwound from a roll 1 suitably supported for rotation with its axis indicated by the line 2—2 arranged at an angle of around 75° to the line of advance of the web to a rubberizing appliance indicated generally at 3. Of course the angle of the supply roll to the line of feed may be varied to suit the amount of increased capacity to stretch it is desired to obtain in the fabric. The rubberizing appliance may be the ordinary calender or spreading machine, but it is preferred to employ rubber in the form of latex with or without compounding and/or vulcanizing ingredients and the appliance 3 may take the form of the tank illustrated containing such rubber latex indicated as filling the same to the level 4 through which the web of fabric from the roll 1 is drawn under tension with or without a weighted roll 5 to aid in controlling the movement of the filler of the fabric. The shifting of the filler threads indicated at 6 from the right angular relation they have in the roll to the desired angular relation to the warp threads 7 is thereby effected. The web of fabric from the roll 1 is passed under and over suitable guide rolls indicated at 8 and through the rubber latex as illustrated in Figure 2 of the drawings. The thus rubberized material with or without a skim coating treatment may be dried and wound up as convenient. It is subsequently cut into strips as illustrated in Figure 4 of the drawings. The angle in which the weft or filling threads cross the warp threads may be conveniently referred to as the racking angle and this is indicated at R in Figure 4. Preferably this angle is around 70°–75°. The angle at which the web of fabric is cut into strips—by being intermittently advanced step by step to and under a reciprocating cutter or other suitable form of severing machine in a manner well known—is referred to as the cutting angle and is indicated in the drawings at C in Figure 4. Usually this angle is 45°, but to obtain the full advantages of the present invention the racked fabric should be cut at such an angle as to bring the shorter diagonal of the diamond-shaped mesh into approximately parallel relation with the length of the cut strips. If the racking angle is 75°, the utmost increased capacity to stretch may be obtained by cutting the web of fabric at an angle of around 52½°. It is to be understood therefore that the racking angle and the cutting angle may be varied to suit the character of the woven fabric and to achieve the increased capacity desired. One skilled in the art can readily find the proper racking angle and the proper cutting angle for the particular fabric which is to be incorporated in the tire.

The process above detailed is the prefered procedure but any other suitable and convenient method may be utilized to prepare the material of this invention. For instance, instead of employing square woven fabric and pulling upon that in such a way as to shift the angle of the weft threads relative to the warp threads, the fabric may be initially woven with the weft threads at the desired angle. Or it may be woven square and the weft threads shifted by the web manufacturer and wound up in that condition and delivered to the tire manufacturer to be run through a calender or solutioning machine (rubber latex or rubber dissolved in a solvent). Friction and skim coats at a suitable gage may be applied by the manufacturer when and as desired. The invention in its broadest aspects is not intended to be confined to the particular process and procedure being detailed. The invention contemplates the production of a strip of rubberized fabric with the threads arranged to form a diamond-shaped mesh the shorter diagonal of which mesh extends in the direction the material is to be distended either in the operation of shaping the article (tire casing) before vulcanization, or in the finished article itself after vulcanization. The diamond-shaped mesh referred to is indicated in Figure 4 of the drawings by the numeral 9. It will be understood of course that the illustration of the drawings is diagrammatic in character, the finished rubberized material appearing like any other old rubberized fabric excepting for the special arrangement of the warp and weft (or filling) threads.

It is preferred to rubberize the fabric in the form of a web and cut it into strips suitable for breakers, or any other use to which the invention may be applied, as for instance, chaffing strips, or possibly, in the plies of the carcass itself, or in the manufacture of hose and tubing such as in player-pianos. It will be obvious that the warp and weft threads may be brought to the desired angular relation and cut before being rubberized, if desired. However, this latter alternative is deemed much less desirable from a manufacturing standpoint than the preferred procedure of rubberizing before cutting.

Having thus described my invention, what I claim and desire to protect by Letters Patent is:—

1. A process of manufacturing fabric for rubber articles which consists in arranging the weft threads of a web of woven fabric at acute and obtuse angles to the warp threads, applying rubber thereto to temporarily maintain the threads in such angular relation in the web, and cutting the web of rubberized fabric into strips with the non-rectangular parallelograms formed by any two pair of warp and weft threads arranged so that the shorter of the unequal diagonals of such parallelograms extend in the general direction of the line of cut whereby to increase the capacity of the cut strips of rubberized fabric to be distended without rupture.

2. Fabric for rubber articles having interwoven and rubberized warp and weft threads forming a diamond-shaped mesh and coated with rubber, the warp and weft threads being arranged to swing rather than stretch on the initial application of tension in a direction transverse the diamond-shaped mesh.

3. A breaker strip consisting of rubberized interwoven cord elements forming a diamond-shaped mesh the diagonals of which mesh are shorter lengthwise than crosswise the strip whereby to increase the capacity of the strip to be distended without rupture.

Signed at Hartford, county of Hartford, and State of Connecticut, this 8th day of October, 1925.

HECTOR V. LOUGH.

threads forming a diamond-shaped mesh and coated with rubber, the warp and weft threads being arranged to swing rather than stretch on the initial application of tension in a direction transverse the diamond-shaped mesh.

3. A breaker strip consisting of rubberized interwoven cord elements forming a diamond-shaped mesh the diagonals of which mesh are shorter lengthwise than crosswise the strip whereby to increase the capacity of the strip to be distended without rupture.

Signed at Hartford, county of Hartford, and State of Connecticut, this 8th day of October, 1925.

HECTOR V. LOUGH.

DISCLAIMER 1,607,266.—*Hector V. Lough*, Hartford, Conn. RUBBERIZED FABRIC AND ITS METHOD OF MANUFACTURE. Patent dated November 16, 1926. Disclaimer filed June 24, 1936, by the assignee, *United States Rubber Company*.

Hereby enters this disclaimer to claim 3 of said patent.

[*Official Gazette July 28, 1936.*]

DISCLAIMER 1,607,266.—*Hector V. Lough*, Hartford, Conn. RUBBERIZED FABRIC AND ITS METHOD OF MANUFACTURE. Patent dated November 16, 1926. Disclaimer filed June 24, 1936, by the assignee, *United States Rubber Company*.

Hereby enters this disclaimer to claim 3 of said patent.

[*Official Gazette July 28, 1936.*]